United States Patent [19]

Mazzucchelli

[11] 4,206,822

[45] Jun. 10, 1980

[54] APPARATUS FOR THE EXACT WEIGHING OF MATERIAL IN LOTS OF MIXED-SIZE PIECES

[76] Inventor: Peppino Mazzucchelli, Via Roma 77, 20020 Barbaiana di Lainate (Milan), Italy

[21] Appl. No.: 928,523

[22] Filed: Jul. 27, 1978

[30] Foreign Application Priority Data

Jul. 28, 1977 [IT] Italy ................................ 26270 A/77

[51] Int. Cl.² ...................... G01G 19/04; G01G 19/22
[52] U.S. Cl. .......................................... 177/25; 177/70
[58] Field of Search .................... 177/1, 25, 70, 123; 209/592–594

[56] References Cited

U.S. PATENT DOCUMENTS

| 2,802,658 | 8/1957 | Hensgen et al. ................. 209/593 X |
| 3,690,391 | 9/1972 | Rust ................................... 177/123 X |
| 3,708,025 | 1/1973 | Soler et al. ................................ 177/1 |
| 3,939,928 | 2/1976 | Murakami et al. ..................... 177/25 |
| 3,974,888 | 8/1976 | Murakami et al. ................. 177/50 X |
| 4,106,628 | 8/1978 | Warkentin et al. ............. 209/593 X |
| 4,123,970 | 11/1978 | Quante ............................. 177/123 X |

Primary Examiner—George H. Miller, Jr.
Attorney, Agent, or Firm—Young & Thompson

[57] ABSTRACT

An apparatus for the exact weighing of materials, especially fruit and vegetables, in lots of mixed-size pieces feeds a plurality of pieces to a plurality of scales, carries out the weighing of one or more pieces on single scales, calculates the sum of successive groups of weights read from differently selected scales, and the difference between the wanted draft and each of said sums in order to select the group of weights and hence of scales carrying pieces for a total weight differing from the wanted draft to a predetermined allowed extent, and operates the unloading of the pieces from the selected scales.

6 Claims, 9 Drawing Figures fig. 3 fig. 4 fig.5 fig.6 fig.8 fig.9

4,206,822

APPARATUS FOR THE EXACT WEIGHING OF MATERIAL IN LOTS OF MIXED-SIZE PIECES

BACKGROUND OF THE INVENTION

The problem of the exact weighing of materials, in lots of mixed-size pieces, is very much felt now-a-days.

Especially in the field of fruit and vegetables—the most important example being that of oranges—the requirements of international markets have lately become very burdensome: it is in fact necessary, on one hand, to supply packings of weight being very close to an exact value, containing a certain number of pieces of the product, while on the other hand, the differences in size or in "gauge" between the single pieces have to be minimum. It is therefore difficult and it requires time to obtain satisfactory results in these weighing operations, with series problems for the producers.

The object of the present invention is to solve the aforespecified problems by means of a highly improved automatic machine, allowing to obtain high precisions in the weight of single quantities of products formed by mixed-size pieces (for example, typically, of packings containing 1.2 or 5 Kgs of oranges), with minimum size differences between the pieces.

SUMMARY OF THE INVENTION

In substance, the apparatus according to the invention is characterized in that it feeds a plurality of pieces to a plurality of scales, in that it carries out the weighing of one or more pieces on single scales, in that it calculates the sum of successive groups of weights read from differently selected scales, and the difference between the wanted draft and each of said sums, in order to select the group of weights and hence of scales carrying pieces for a total weight differing from the wanted draft to a predetermined allowed extent, and in that it operates the unloading of the pieces from the selected scales.

According to a first embodiment of the invention, the apparatus feeds a plurality of pieces, of a total weight equal to a large fraction of the draft to be carried out, all together to a first common scale, and another plurality of pieces, of a total higher weight, one at a time to a corresponding plurality of single scales, the feeding to the common scale and, respectively, to the single scales, being carried out through separate means.

According to a second embodiment of the invention, the apparatus feeds a plurality of pieces, of a total weight equal to a large fraction of the draft to be carried out, to two or more common scales, and another plurality of pieces, one at a time, to a corresponding plurality of single scales, the feeding to the common scales and to the single scales being carried out by the same means.

In both the aforespecified embodiments, the apparatus according to the invention carries out the weighing of the group of pieces on the common scale or scales, and the weighing of the single pieces on the single scales, calculating the sum of the first weights with successive groups of the second weights, differently selected, and the difference between the wanted draft and each of said sums, so as to select the single scales which, together with the common scale or scales, carry a weight differing from the wanted draft to a predetermined allowed extent; and it operates the unloading of the pieces from the common scale or scales and from the selected single scales.

The feeding of the pieces to the scale takes place through a plurality of inclined conveyor belts. In the event of the apparatus comprising a single common scale, at least one larger conveyor belt will preferably be provided for the common scale, and smaller, equally sized, conveyor belts for the single scales. In the event of the apparatus comprising two or more common scales, it will be preferable to use all equally sized conveyors, feeding a single piece at a time, and the common scales with be placed above the single scales and one portion of their bottom part will tilt automatically from a position apt to receive the pieces being fed by the conveyors, to a position whereby the fed pieces drop onto the underlying single scales.

The unloading from the scales takes place by opening of gates or the like provided in said scales, or by rotation of the pan of said scales, and all the pieces to be unloaded drop onto a common conveyor belt directed to the packing; the weighings, the calculations of sum and difference, and the comparison, as well as the formulation of the values of the wanted draft and of the tolerance allowed, are obtained through an electronic system forming part of the apparatus.

Preferably the scales are of the type for electronically testing the flexure—produced by weight—of a bar.

The electronic system preferably comprises an analogic switch, receiving weight indicating signals from the single scales and transmitting them to a memory provided with a pulse generator; an adder, receiving directly the weight signals from the common scale or scales and, in succession, groups of weight signals from various single scales, determined by said pulse generator, and making, in succession, the sums of said signals with said groups of signals; a comparator, to which said sums are sent; a programmer, associated to said adder and to said comparator, this latter comparing said sums of the adder with a signal of the programmer corresponding to the wanted draft; and logic circuits for control and restarting of the cycle, to which are sent signals from the comparator in order to stop the comparison and operate the unloading of said single scales as soon as the difference between the wanted draft signal of the programmer and the sum of said sums under comparison is below a valve preset by the programmer.

BRIEF DESCRIPTION OF THE DRAWINGS

The invention will now be described in further detail, by mere way of example, with reference to two preferred embodiments thereof, illustrated by the accompanying drawings, in which:

FIG. 6 is a side view of a second embodiment of the weighing apparatus according to the invention, of which

DESCRIPTION OF THE PREFERRED EMBODIMENTS

Figure 2:
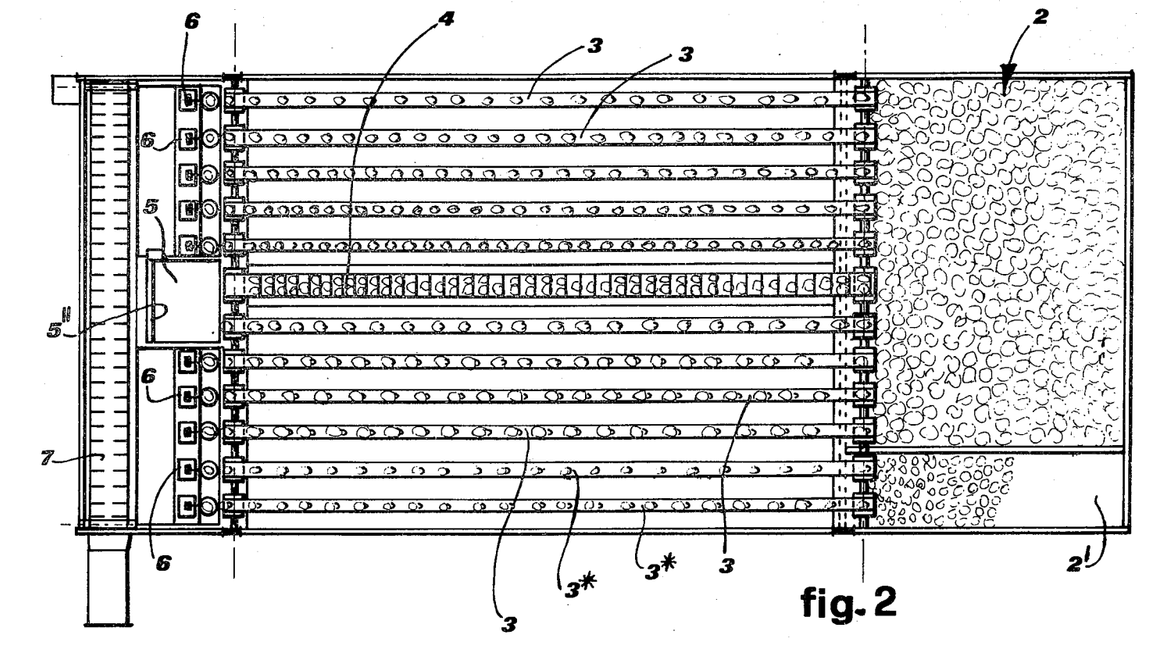
FIG. 2 is a top plan view of the apparatus of FIG. 1.
Figure 3:
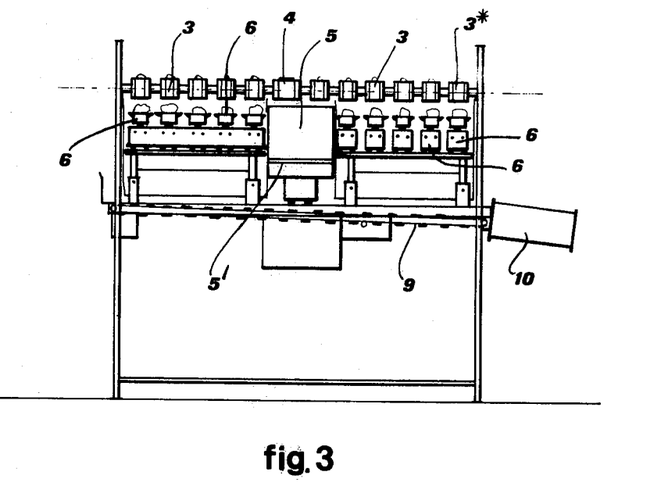
FIG. 3 is a rear view of the apparatus of FIGS. 1 and 2.
Figure 4:
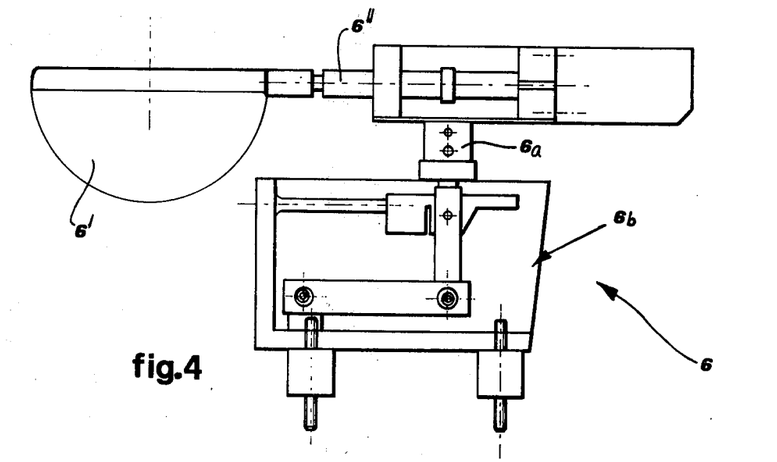
FIG. 4 shows in detail one of the single scales of the apparatus of FIGS. 1 to 3.

With reference first to FIGS. 1 to 5 of the drawings, illustrating the first embodiment of the invention, the weighing apparatus comprises, on a stout frame 1 with inclined plane, a lower hopper 2 for feeding the pieces to be weighed—for example oranges—, a plurality (ten, in the drawing) of ascending belt conveyors 3, on each side of two ascending belt conveyors 4, 4', the first of which is wider than the previous ones and, at the upper end of the conveyors, a large scale 5 (common scale) corresponding to the conveyors 4,4' and as many small scales 6 (single scales) as there are conveyors 3. There is further provided a transversal belt conveyor 7, projecting from the frame 1 beyond the scales 5 and 6 and being fed by these last ones, directly for what concerns the scale 5 and through hoppers 8 (FIG. 1) for what concerns the scales 6. The transversal conveyor 7 is in constant movement; the conveyors 4, 4' for the scale 5 and the conveyors 3 for the scales 6 are all controlled by an upper transversal chain 9 (FIG. 3), moved by a motor 10, through single friction clutches, which are engaged if the scales are empty and get disengaged when there is a certain weight on the scales. One of the single scales 6 is illustrated in FIG. 4: it comprises a pan 6' which, in the case shown, consists of a half-sphere apt to contain an orange and the pivot 6'' of which can be rotated by an electric geared motor, to drop said orange onto the belt conveyor 7. A support 6a of the pan serves to connect the pan itself to the base 6b of the scale and to transmit a component of the actual weight to the electronic flexure scale mechanism arranged within said base (as partly shown in the drawing) and well known per se to the skilled in the art.

Figure 1:
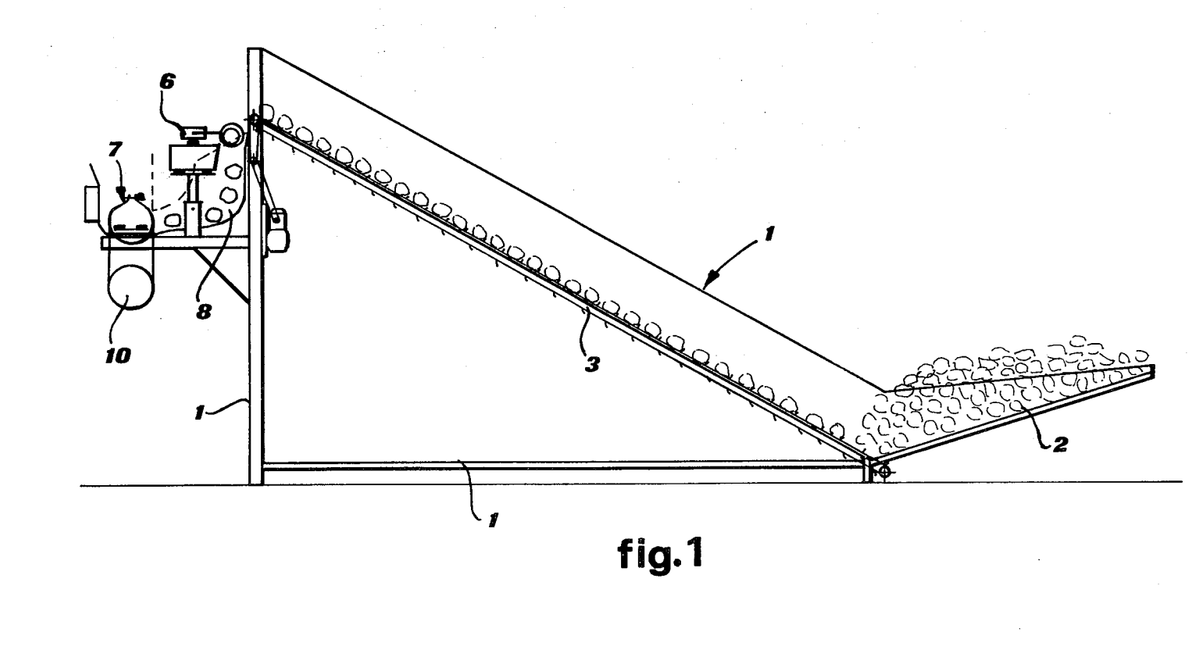
FIG. 1 is a side view of a first embodiment of the apparatus according to the invention.

The common scale 5 is similar to the one heretofore described, with the difference that its dimensions are far larger and that, instead of having a rotatable pan 6', it has a large plate 5', provided with sides and with a lateral unloading gate 5'', to be opened by means of an electromagnetic control.

The scales 6 are all alike. Also the conveyors 3 feeding them may all be alike, but preferably, there will be a few among them (two, in the case shown in the drawing, marked by reference 3) slightly smaller, so as to receive pieces of smaller sizes, being fed in an area of the hopper 2 delimited by a partition 2', and to facilitate the selection of weights corresponding or being close to the wanted draft.

In the already cited case of oranges, the international rules provide for the presence of two pieces of smaller size in 1 kg. of product: the apparatus illustrated in the accompanying drawings is therefore suited for weighing this type of fruit.

Figure 5:
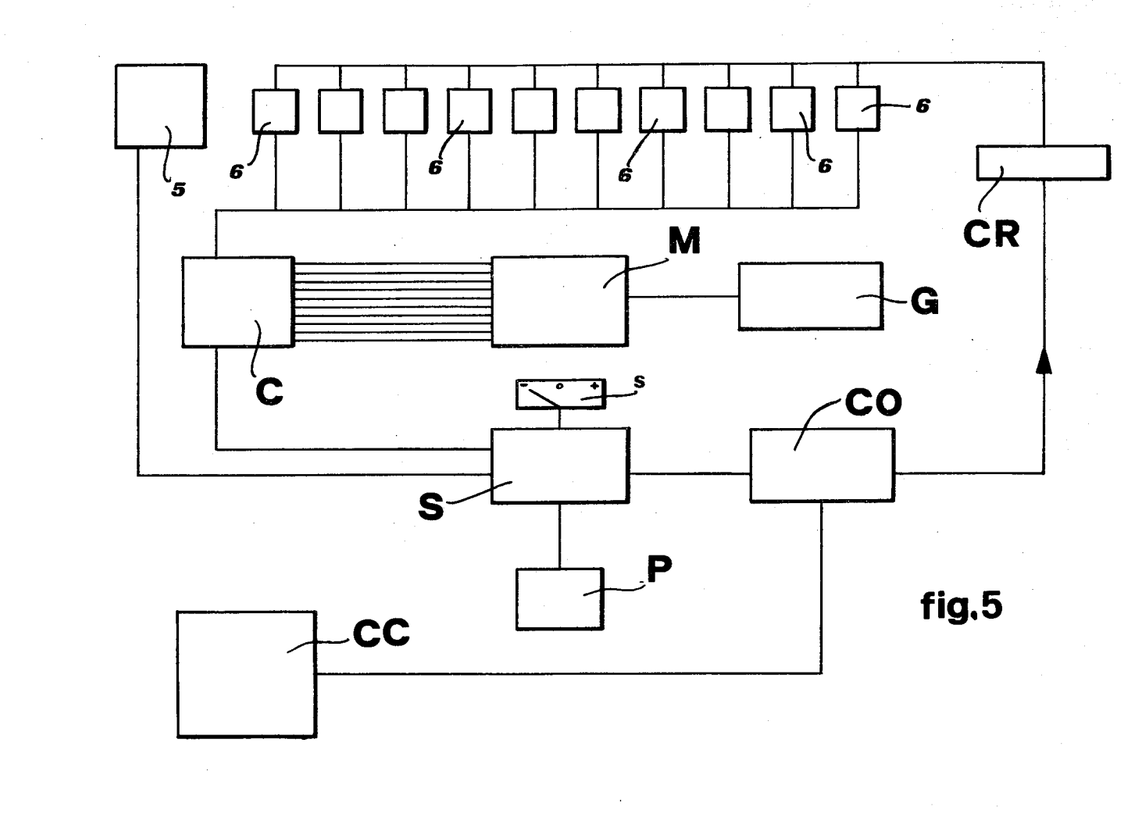
FIG. 5 is a diagram of the electronic system forming part of the same apparatus.

FIG. 5 is a diagram of the electronic system controlling the operation of the apparatus.

This diagram shows the common scale 5 and the ten single scales 6, the outputs of which form weight indicating signals.

The system comprises an analogic switch C, which receives the weight indicating signals from the single scales 6 and transmits them to a memory M provided with a pulse generator G. It further comprises an adder S, which receives directly the weight indicating signal of the commons scale 5 and, in a succession determined by the pulse generator G, groups of weight signals of a certain number of continuously different and differently combined single scales 6. The adder S is apt to perform, in succession, the sums of the weight signal of the common scale with said groups of signals, and to feed said sums to a comparator CO, which also forms part of the system together with a programmer P, associated to the adder S together with a reading instrument s. The programmer P serves both to preset the wanted draft, and to establish the allowance limits into which must fall the actual drafts, in respect of the wanted draft, and the relative signals are fed to the comparator CO through the adder S. The system finally comprises logic control circuits CC and cycle restart circuits CR, controlled by the outputs of the comparator CO. The logic control circuits are apt—when being activated—to transmit to the controls of the scales the decisions taken by the electronic system, operating the opening of the gate 5'' of the scale 5, and the rotation of the pan 6' of those scales 6 the weight signals of which form part of the selected group of signals. Whereas, the cycle restart circuits CR control the cyclic performance of the operations in the electronic system and, consequently, in the whole apparatus.

A second embodiment of the apparatus according to the invention is illustrated by FIGS. 6 to 9. This apparatus also comprises a stout frame 11 with inclined plane, a lower hopper 12 for feeding the pieces to be weighed (for example oranges), a plurality (nine, in the case illustrated) of ascending belt conveyors 13 and, at the upper end of the conveyors, one or more larger capacity scales 15 at the top (two, in the case shown) and as many small single scales 16 at the bottom (that is, arranged just below the ones at the top 15), as there are conveyors 13 (that is, nine). Furthermore, one or moer transversal belt conveyors 17, in continuous movement, are provided to carry the product unloaded from said scales to the packing.

Figure 6:
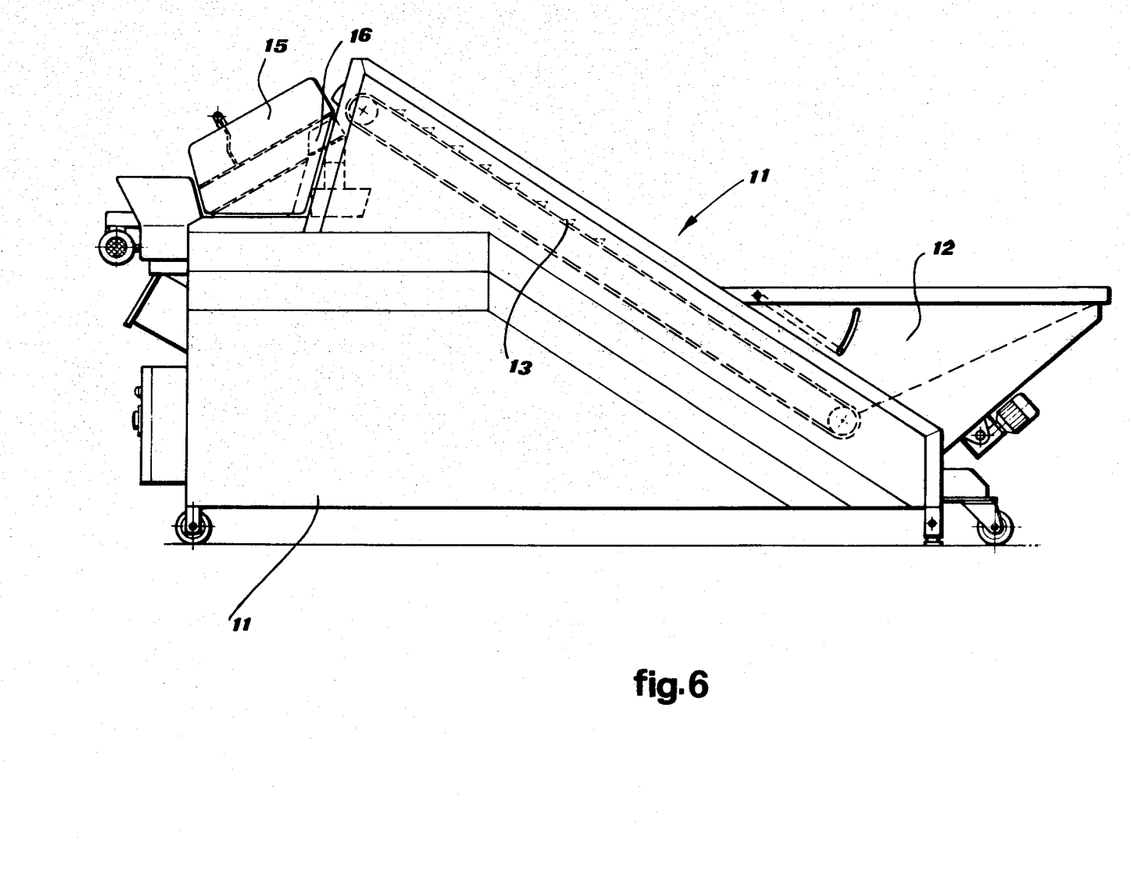
Figure 7:
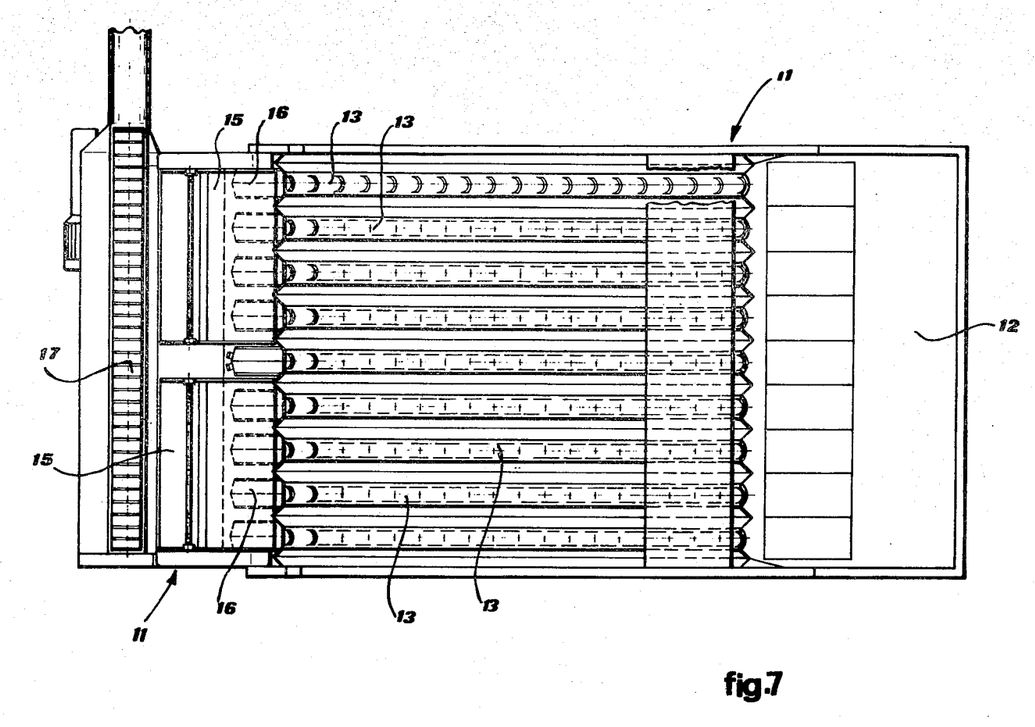
FIG. 7 is a plan view.
Figure 8:
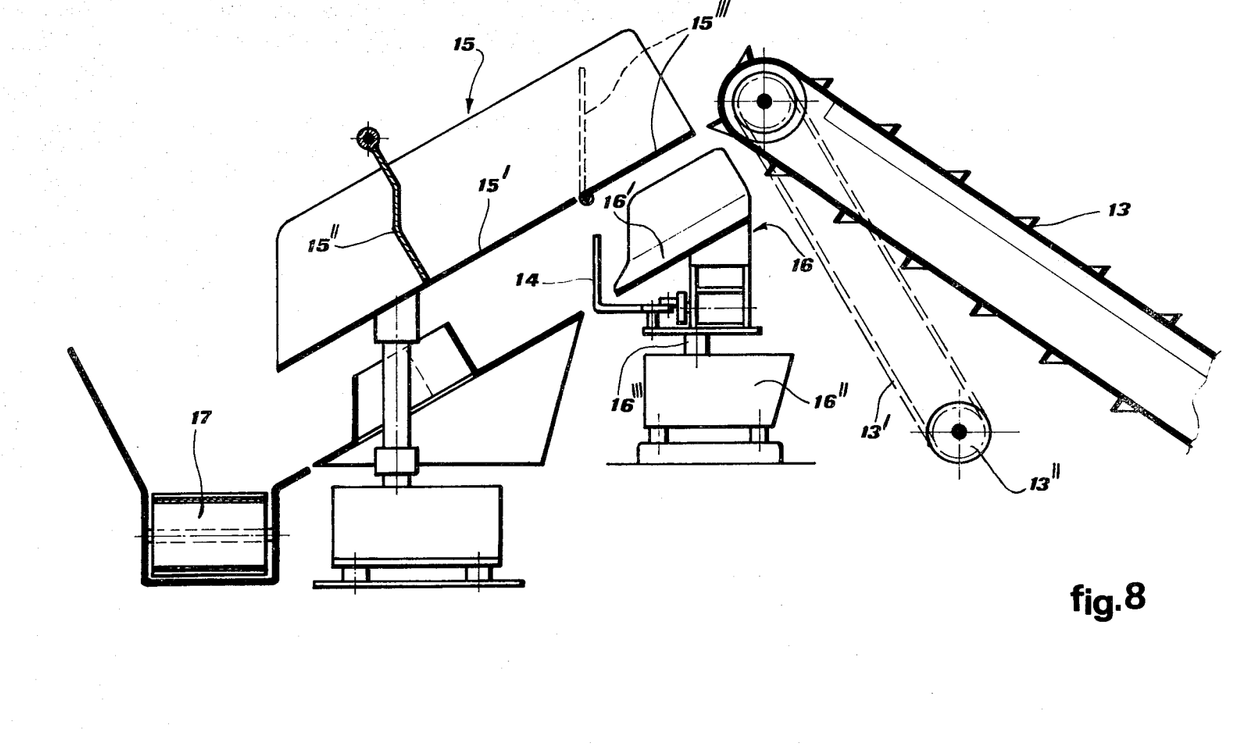
FIG. 8 is a detailed schematic view of a feed conveyor belt, of a large common scale and of a small single scale of the apparatus of FIGS. 6 and 7, as well as of the means for unloading the weighed product from said scales.

The belt conveyors 13 are controlled by chains 13' moved by a motor through single friction clutches 13'', which are engaged if the single scales 16 are empty and get disengaged when there is a certain weight on said scales 16.

The small single scales 16 each comprise an appropriately shaped and slanting pan 16', apt to contain the product unit to be weighed (for example, an orange) and connected to the base 16'' of the scale itself through a support 16'''. This support is apt to transmit a component of the weight carried by the pan 16' to an electronic flexure scale mechanism—of the type heretofore-specified—arranged within the base 16''. The product (orange) is kept on the pan 16' of the scale 16 by a gate 14 or the like, apt to be moved for unloading the product itself under control of an electromagnet or by another system.

The larger capacity scale 15 is similar to the ones 16 heretofore described, with the difference that its dimensions are far bigger and that, instead of a shaped pan (like 16'), it comprises a large flat plate 15' provided with sides and with an unloading gate 15'', apt to be opened by oscillation under the control of an electromagnet, or by another system. Moreover, the end portion 15'''' of the bottom of the plate 15', being close to the conveyor belt 13, is apt to tilt from a position (shown in full lines) aligned with the rest of the plate, to a raised position (shown in dashed lines) uncovering the underlying scales 16. The feeding of the plates 15' of the larger capacity scales 15 and of the pans 16' of the single scales 16 is controlled by said bottom end portion 15'''' which acts as a gate and which:

in the down aligned position in full lines, allows the feeding of the larger capacity common scales, excluding the feeding of the single scales;

in the raised position in dashed lines, allows the feeding of the single scales which are placed in a position below.

The scales 16 are all identical one to the other. Also the conveyors 13 feeding them are all identical one to the other, in the apparatus shown; however, there could be some conveyors of reduced dimensions, for receiving pieces of smaller sizes being fed in a separate zone of the hopper 12, in order to facilitate the selection of weights corresponding or close to the wanted draft.

The unloading of the pieces (oranges) from the scales 15 and 16 onto the transversal conveyor belt 17 takes place through connecting chutes 17' and 17'', the first of which is only an extension of the bottom of the plate 15' of the scales 15.

Figure 9:
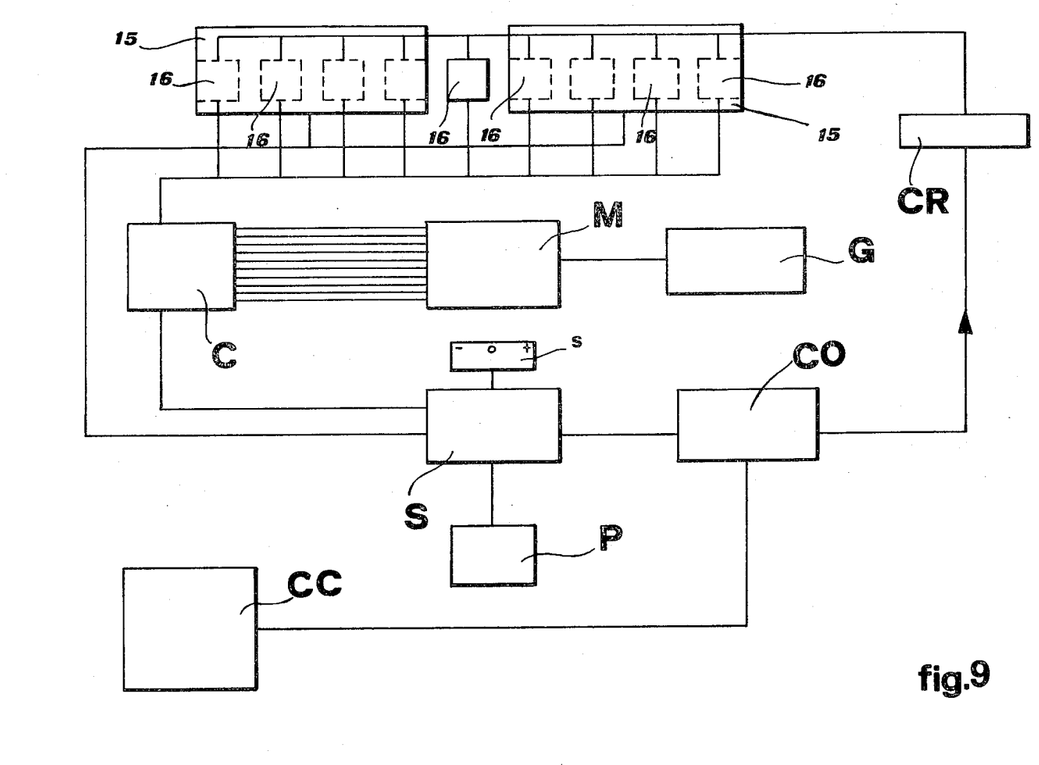
FIG. 9 is the diagram of the electronic system controlling the operation of the apparatus of FIGS. 6 to 8.

The electronic system controlling the operation of the apparatus of FIGS. 6 to 8 is substantially the same as that controlling the operation of the apparatus of FIGS. 1 to 5, with the difference, however, that in the apparatus of this second embodiment one has to deal with two signals being sent directly to the adder S by the two large common scales 15. In the diagram of FIG. 9, these scales 15 are shown overlying the single scales 16, the signals of which go (as in the previously described case) to the switch C.

The apparatus shown works as follows. The belt conveyors 3, 4 and 4', or 13, take the pieces (for example, oranges) which are fed to them by the hopper 2 or 12, and carry them towards the scales 5 and 6, or 15 and 16. On the conveyors 3, 4' and 13, the pieces come up in a single row, one by one; on the conveyor 4, they may come up partly in a row and partly into more rows, according to the size and as illustrated.

In the case of the apparatus of FIGS. 1 to 5, several pieces drop from the top of the conveyors 4, 4' into the common scale 5, before the relative weight stops the movement of the conveyors 4, 4' while a single piece arrives onto each single scale 6, after which the corresponding conveyor 3 stops.

In the case of the apparatus of FIGS. 6 to 9, the conveyors 13 each feed one piece at the time to the common scales 15, up to when the bottom element 15'''' of such scales is in the down position shown in full lines. When the pieces in the scales 15 reach a certain pre-established weight, the bottom element 15'''' is tilted in the raised position shown in dashed lines, thereby uncovering the scales 16, to which each conveyor 13 feeds one piece and then stops.

At this stage, the weighing is carried out of all the pieces which are together on the scale 5, or on the scales 15, and of each single piece occupying each of the scales 6, or 16.

The signals indicating the weights measured by the scale 5, or by the scales 15, are sent directly to the adding circuit S, while the signals corresponding to the weights measured by the scales 6, or 16, are all sent to the memory M, through the analogic switch C. From the memory M are sent, on the other hand, to the adder S groups of weight indicating signals corresponding to continuously different groups of scales 6, or 16. These groups of signals are sent in succession and they are formed, time after time, by the pulse generator G. In the adder S, said groups of signals are added, in the same succession, one at the time, with the signals coming from the scales 5, or 15. The single sums, thus obtained in the adder S, are then compared in the comparator CO with a signal corresponding to the wanted draft, supplied by the programmer P. Each time that the comparison shows a difference—between that under comparison of said sums and said signal corresponding to the wanted draft—which is higher than a certain value having been preset by the programmer P as the maximum allowed value, new groups of signals are called by the memory M and the cycle continues.

Whereas, when said difference turns out to be less than the preset value (which means that the actual draft corresponding to the group of weight indicating signals under comparison, is close to the wanted draft to the desired extent), the signals which the comparator sends to the logic control circuits CC and to the cycle restart circtuits CR, are such as to interrupt, on one hand, the repeating cycle for carrying out the comparisons in the electronic system and to operate, on the other hand, the controls required for unloading the pieces held on the scales which correspond to the group of signals under comparison.

Thus, the opening of the gates 5'' of the scale 5, or 15'' of the scales 15, is operated simultaneously with the rotation of the pans 6' or the movement of the gates 14, of those scales 6 or 16 from which arrive the weight indicating signals forming part of the group of signals under comparison. In this way, the pieces (oranges) dropping onto the conveyor belt 7, or 17, and being sent to packing, have altogether a weight which is close to that of the wanted draft and certainly differs therefrom only by a smaller value than that preset as the maximum allowed value by the programmer P of the electronic system, exactly as one wanted.

The cycle of the apparatus may at this point start again: the conveyor belts 3, 4 and 4' or 13 (or rather, those out of the conveyors which are not blocked by the presence of weights on the scales) start working again, and the apparatus may perform a new draft, and this can continue at a high rate, which is quite compatible with industrial requirements.

The approximation to the wanted draft may of course be easily varied by the help of known techniques, so as to adapt the apparatus to the requirements (even the strictest ones: in this case, there will be a larger number of combinations of pieces to discard) which will arise each time for the user.

The apparatus may be completed with acoustic and/or luminous indicators, apt to indicate to the operators when the single actual drafts fall within the limits of the established allowances in respect of the wanted draft, or alternatively, when none of the possible combinations of pieces weighed on the scales 5 and 6, or 15 and 16, allow to fall within said limits (which may sometimes occur), so as to allow the elimination of unacceptable drafts.

In combination with, or in alternative to said indicators, it is possible to apply devices apt to cause the automatic variation of the preset allowance, in the sense of increasing the value of the draft, so as to allow the machine to go on working without interruption.

It is understood that, apart from those heretofore described by way of example, there may be other embodiments of the invention apt to be carried out by the skilled in the art.

All these embodiments, or the modifications of those heretofore described, fall of course within the scope of the present invention.

I claim:

1. Apparatus for the exact weighing of materials, especially fruit and vegetables, in lots of mixed-size pieces, characterized in that it feeds a plurality of pieces to a plurality of scales, in that it carries out the weighing of one or more pieces on single scales, in that it calculates the sum of successive groups of weights read from differently selected scales, and the difference between the wanted draft and each of said sums in order to select the group of weights and hence of scales carrying pieces for a total weight differing from the wanted draft to a predetermined allowed extent, and in that it operates the unloading of the pieces from the selected scales, comprising means for feeding a plurality of pieces, of a total weight equal to a large fraction of the draft to be carried out, all together to a first common scale, and another plurality of pieces, of a total higher weight, one at a time to a corresponding plurality of single scales, the feeding to the common scales and, respectively, to the single scales, being carried out through separate means; means for weighing the group of pieces on the common scale and the single pieces on the single scales, means for calculating the sum of the first weight with successive groups of the second weights, differently selected, and the difference between the wanted draft and each of said sums, so as to select the single scales which, together with the common scale, carry a weight differing from the wanted draft to a predetermined allowed extent; and means for unloading the pieces from the common scale and from the selected single scales.

2. Apparatus as in claim 1), wherein the feeding of the pieces to the scales takes place through the plurality of inclined conveyor belts, or which at least one larger conveyor belt for the common scale and other smaller, equally sized, conveyor belts for the single scales.

3. Apparatus as in claim 1), wherein the unloading from the scales takes place by opening of a lateral gate provided in the plate of the common scale and by rotation of the pans of the single selected scales, with dropping of all the pieces to be unloaded onto a common conveyor belt directed to the packing.

4. Apparatus for the exact weighing of materials, especially fruit and vegetables, in lots of mixed-size pieces, characterized in that it feeds a plurality of pieces to a plurality of scales, in that it carries out the weighing of one or more pieces on single scales, in that it calculates the sum of successive groups of weights read from differently selected scales, and the difference between the wanted draft and each of said sums in order to select the group of weights and hence of scales carrying pieces for a total weight differing from the wanted draft to a predetermined allowed extent, and in that it operates the unloading of the pieces from the selected scales, comprising means for feeding a plurality of pieces, of a total weight equal to a large fraction of the draft to be carried out, to two or more common scales, and another plurality of pieces, one at a time, to a corresponding plurality of single scales, the feeding to said common scales and to said single scales being carried out by the same means; means for weighing the group of pieces on the common scales and the single pieces on the single scales, means for calculating the sum of the first weights with successive groups of the second weights, differently selected, and the difference between the wanted draft and each of said sums, so as to select the single scales which, together with the common scales, carry a weight differing from the wanted draft to a predetermined allowed extent; and means for unloading the pieces from the common scales and from the selected single scales.

5. Apparatus as in claim 4), wherein the feeding of the pieces to the scales is carried out through a plurality of inclined conveyor belts, which are adapted to feed one piece at a time and at the unloading ends of which the common scales are placed above the single scales, the bottom end of said common scales being adapted to tilt from a position suitable for receiving the fed pieces to a position whereby the fed pieces drop onto the underlying single scales.

6. Apparatus as in claim 4) wherein the common scales, as well as the single scales are provided with a movable gate for unloading the pieces, through connecting chutes, onto a transverse conveyor belt directed to the packing.

* * * * *